United States Patent [19]

Crowson

[11] Patent Number: 4,745,663
[45] Date of Patent: May 24, 1988

[54] FASTENING DEVICE FOR A ROPE

[76] Inventor: Harold J. Crowson, 7660 Manorwood Dr., Boise, Id. 83704

[21] Appl. No.: 80,609

[22] Filed: Aug. 3, 1987

[51] Int. Cl.⁴ .............................................. F16G 11/00
[52] U.S. Cl. ................................ 24/131 R; 24/129 C; 24/546; 403/206
[58] Field of Search ............. 24/129 R, 129 C, 131 R, 24/131 C, 129 A, 230.5 W, 68 CD, 122, 546, 678, 67.9; 59/83, 93; 403/206

[56] References Cited

U.S. PATENT DOCUMENTS

| 209,776 | 11/1878 | Rickly | 24/546 |
| 347,235 | 8/1886 | Gaunt | 24/131 R |
| 612,160 | 10/1898 | Gorrell | 24/131 C |
| 1,073,226 | 9/1913 | Freeman | 24/131 R |
| 1,159,501 | 11/1915 | Kimbark | 24/129 C |
| 1,268,132 | 6/1918 | Lenzen | 24/131 R |
| 2,426,768 | 9/1947 | Farmer et al. | 24/129 R |
| 2,478,184 | 8/1949 | Elliott | 24/230.5 W |
| 3,722,164 | 3/1973 | Schmidgall | 24/546 |
| 4,435,102 | 3/1984 | Smith | 403/206 |

FOREIGN PATENT DOCUMENTS 260862  11/1926  United Kingdom ............. 24/131 C

Primary Examiner—Victor N. Sakran
Attorney, Agent, or Firm—Paul F. Horton

[57] ABSTRACT

A fastening device for a rope; the fastening device serving as an attachment hook, a tie-down binder, or a rope joiner, all without the use of knots in the rope or ropes. The device includes a shank having a hook at one end and an open loop at the other end. The open loop continues into a double parallel leg arrangement defining an open slot therebetween and terminates in a third leg. In that all slots and loops are open, the device may be attached anywhere along the mid-length of a rope to provide the functions, indicated.

4 Claims, 1 Drawing Sheet

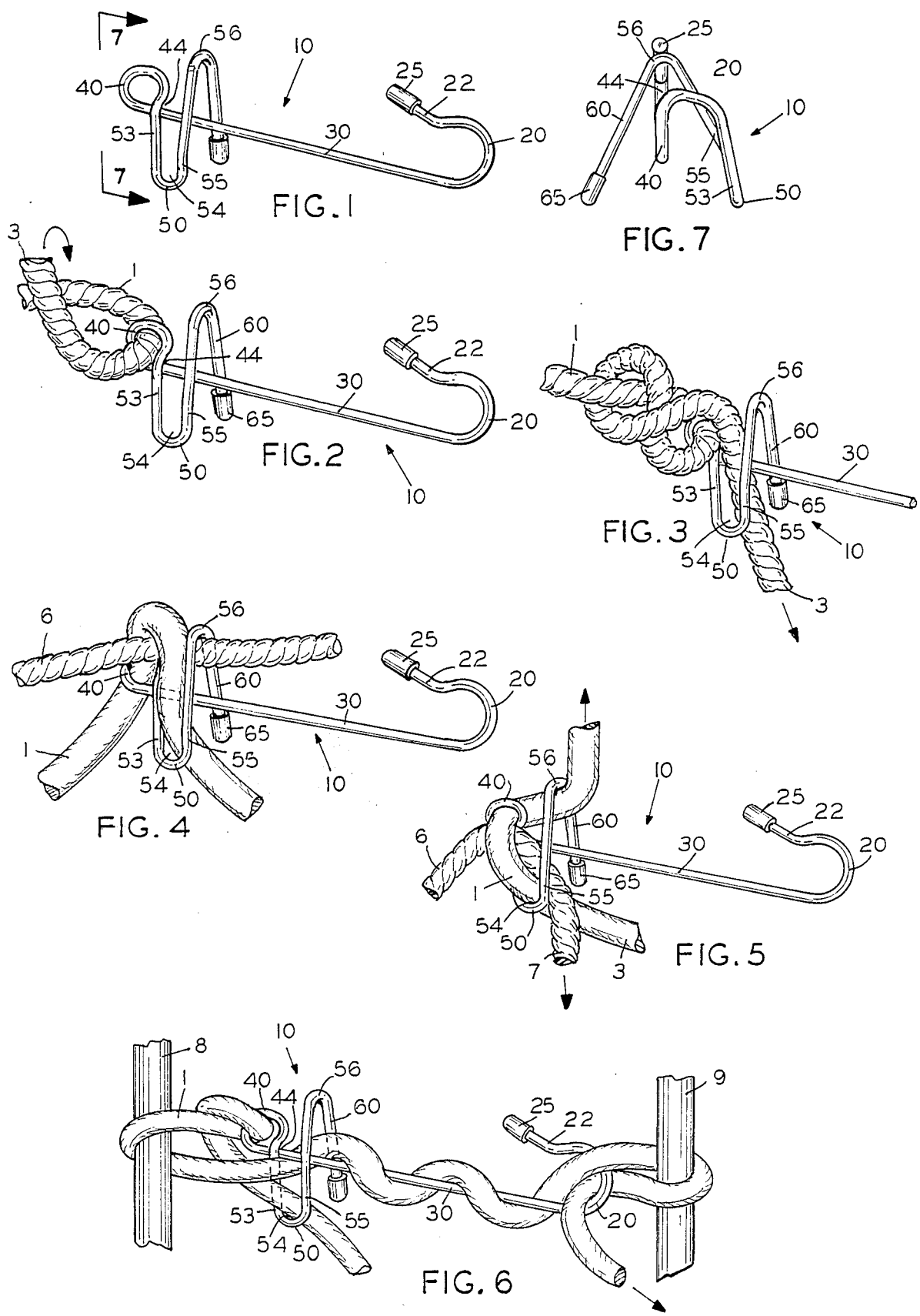

FASTENING DEVICE FOR A ROPE

BACKGROUND OF THE INVENTION

1. Field of the Invention

This invention relates, in general, to rope fasteners and, more particularly, to rope fasteners which may be attached to the rope anywhere along the length of the rope for hook, tie-down, and rope joining applications, without the use of knots.

2. Description of the Prior Art

Many rope fastening devices have been invented to serve as towlines, hooks, and tie-downs, as typified by U.S. Pat. No. 931,754 issued to G. S. Greenleaf; U.S. Pat. No. 1,418,958 issued to G. W. Moore; U.S. Pat. No. 1,687,409 issued to R. Weber; U.S. Pat. No. 3,728,762 issued to J. Hogg; and U.S. Pat. No. 4,435,102 issued to R. G. Smith. Such fasteners all require knots or clamps for attachment of the rope, or, in the alternative, require that the rope be fed through closed eyes of the device. None of the references cited may be fastened to a rope along mid-length without knots or without rope end feed throughs.

Other devices, as typified by U.S. Pat. No. 1,159,501 issued to C. Kimbark; U.S. Pat. No. 4,214,350 issued to W. L. Copelan; and U.S. Pat. No. 4,414,711 issued to M. Hubbard require the use of rope knots or clamps and do not provide hook or rope joiner functions.

SUMMARY OF THE INVENTION

The present invention overcomes these problems by providing a fastening device for ropes which includes a shank having a hook at one end for attachment directly to another object or for use as a cinch for tie-down applications; which includes an open loop at the opposing end from the hook for receiving a rope without threading, knots, or clamps; a double leg defining an open slot therebetween for frictional engagement with the rope and for receiving the rope along its mid-length; and a single leg operable to engage a rope by simple rotation of the device for placement into the loop. A more thorough description of the fastener may be found in the appended claims.

BRIEF DESCRIPTION OF THE DRAWINGS

FIG. 1 is a perspective view of a preferred embodiment of the fastener of the present invention.

FIG. 2 is a perspective view of the device showing rope insertion into the open loop and slot of the device.

FIG. 3 shows the basic rope loop attachment to the device.

FIG. 4 shows early rope positioning for the joinder of two separate ropes by the device.

FIG. 5 shows final rope positioning for the joinder of two separate ropes.

FIG. 6 shows one example of a rope attachment for tie-down application and for cinching of the rope in such an application.

FIG. 7 is an end elevational view as viewed along lines 7—7 of FIG. 1.

DETAILED DESCRIPTION OF THE INVENTION

Referring now to the drawings, and, more particularly to FIG. 1, a preferred embodiment of fastening device 10, made according to the present invention is disclosed. Device 10 comprises a body having a straight shank 30 provided with a hook 20 at one end and an open eye or loop 40 at the opposing end. Loop 40 is formed by a curvature of the body at the end of the shank and, at its termination, terminal end 44, continues to define a double leg designated generally by the numeral 50, having a first leg 53 and a second leg 55 with an open slot 54 defined therebetween. Legs 53 and 55 are substantially parallel with one another and substantially perpendicular to shank 30 and are spaced from the shank so that a rope may be inserted between the shank and each of the legs. At the terminal end, that is knee 56 of second leg 55, the body is bent at substantially a ninety degree angle to define a single third leg 60, which is also spaced from shank 30 on the side opposite the second leg. Hook 20 is preferably planar with loop 40 and the shank to prevent any twisting action upon cinching and may include an end portion 22 which is angled upward and away from the shank to more readily hook a rope or other object. Soft plastic caps 25 and 65 may be placed over the free ends of hook 20 and leg 60, respectively, to prevent injury to the user.

To attach a rope for use of fastening device 10 as a hook, reference is made to FIGS. 1, 2, and 3. Holding rope 1 in the palm of the right hand, for example, the rope is scooped up by single leg 60 and device 10 rotated one-half turn so that the rope slips between double leg 50 and shank 30 to come to rest in loop 40. In that loop 40 is open and in that the space between the legs of double leg 50 and shank 30 permits insertion into the loop, this procedure can be accomplished anywhere along the length of the rope without threading the rope endwise through any eyes or loops. Once the rope is within loop 40, as shown in FIG. 2, one end of the rope, hereinafter referred to as the free end 3, is rotated around rope 1, over shank 30 and into slot 54 of double leg 50, as shown in FIG. 3. Free end 3 of the rope is then pressed firmly into slot 54 and then tightened for use of the device as a hook. The rope is readily loosened by pushing the rope in a reverse direction through loop 40 and then easily removed from device 10, again without any unthreading of the rope.

To join two ropes together, utilizing device 10, and without knots, the basic rope loop, shown in FIG. 2, is formed. The end of second rope 6 is inserted through the loop of the first rope 1, as shown in FIG. 4. The second rope 6 is then pulled back into slot 54 to tightly engage the first rope and the first rope is caused to engage knee 56 between legs 55 and 60, as shown in FIG. 5. Pulling on end 3 of rope 1 and on end 7 of rope 6 will cause extreme frictional engagement between the ropes in slot 54 and over leg 53 preventing slippage of the ropes. It will be seen that slot 54, loop 40, and knee 56 result in downward pressure being exerted on rope 6 between the loop of rope 1 and leg 53. The ropes may be readily separated by applying reverse motion on the ropes.

For tie-down applications, the basic rope loop, shown in FIG. 2 is again used, with rope 1 encircling or looped around any support structure as for example first support 8, shown to advantage in FIG. 6. The rope may then be rotated about shank 30 a selected number of times to increase friction and therefore reduce slippage, and then is caused to engage a second support 9, which may be, for example, on the opposite side of a trailer. The rope is then brought back through hook 20 with the rope being pulled in the direction of the arrow for cinching of the rope. The rope is then looped again through hook 20 with the spring action of the hook serving to bind the rope in place for permanent tie-down. Again, it will be noted that device 10 may be attached anywhere along the length of the rope for the tie-down application.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Fastening device for a rope comprising a body having a
   shank;
   a curved portion defining a hook at one immediate end of said shank;
   a curved portion defining an open loop at the opposing immediate end of said shank for receiving a rope therein, the openings of said hook and loop facing one another;
   the terminal end of said loop bent to define a double leg including a first leg and a second leg with a slot therebetween for receiving a rope, said legs being parallel to one another and spaced laterally from and perpendicular to said shank; and
   terminal end of said second leg bent to define a single third leg, said third leg also perpendicular to and spaced laterally from said shank.

2. The apparatus as defined in claim 1 wherein said hook and said loop are planar with one another with said shank.

3. The apparatus as defined in claim 1 wherein said hook is provided with a terminal end member bent at an angle away from said shank.

4. The apparatus as defined in claim 1 wherein said third leg is bent at a substantial right angle to said second leg.

* * * * *